United States Patent
Newstadt et al.

(10) Patent No.: US 10,466,924 B1
(45) Date of Patent: Nov. 5, 2019

(54) SYSTEMS AND METHODS FOR GENERATING MEMORY IMAGES OF COMPUTING DEVICES

(71) Applicant: Symantec Corporation, Mountain View, CA (US)

(72) Inventors: Keith Newstadt, West Newton, MA (US); Robert Shaker, Berkley, MA (US); Petrus Johannes Viljoen, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 215 days.

(21) Appl. No.: 15/154,152

(22) Filed: May 13, 2016

(51) Int. Cl.
*G06F 3/06* (2006.01)
*G06F 21/55* (2013.01)

(52) U.S. Cl.
CPC ............ *G06F 3/065* (2013.01); *G06F 3/0619* (2013.01); *G06F 3/0673* (2013.01); *G06F 21/554* (2013.01); *G06F 2221/034* (2013.01)

(58) Field of Classification Search
CPC .......... G06F 21/00; G06F 21/50; G06F 21/51; G06F 21/52; G06F 21/54; G06F 21/55; G06F 21/552; G06F 21/554; G06F 21/56; G06F 21/561; G06F 21/562; G06F 21/564; G06F 21/565; G06F 21/566; G06F 21/568; G06F 21/57; G06F 21/575; G06F 21/577; G06F 21/70; G06F 21/71; G06F 21/74; G06F 3/0614; G06F 3/0619; G06F 3/0626; G06F 3/065; G06F 3/0652; G06F 3/0653; G06F 3/0673; H04L 63/14;
(Continued)

(56) References Cited

U.S. PATENT DOCUMENTS

| | | | |
|---|---|---|---|
| 2007/0157315 A1* | 7/2007 | Moran ............... | G06F 21/52 726/23 |
| 2009/0144545 A1* | 6/2009 | Dhuvur ............. | G06F 21/552 713/165 |

(Continued)

OTHER PUBLICATIONS

Russinovich, Mark, "LiveKd v5.4", https://technet.microsoft.com/en-us/sysinternals/livekd.aspx, as accessed Mar. 14, 2016, Windows Sysinternals, (Mar. 10, 2015).
(Continued)

*Primary Examiner* — Jung W Kim
*Assistant Examiner* — Adrian Stoica
(74) *Attorney, Agent, or Firm* — FisherBroyles, LLP

(57) ABSTRACT

The disclosed computer-implemented method for generating memory images of computing devices may include (1) monitoring a computing device to detect changes made to data stored within the computing device, (2) maintaining a log that describes the data changes made by recording, in response to detecting a change made to a portion of data, both a state of the portion of data after the data change occurred and a time at which the data change occurred, (3) detecting an event that triggers generation of an image of the computing device that represents a state of the computing device at a particular point in time, and (4) in response to detecting the event, generating the image of the computing device by incorporating at least a portion of the log of data changes into the image of the computing device. Various other methods, systems, and computer-readable media are also disclosed.

19 Claims, 7 Drawing Sheets

(58) Field of Classification Search
CPC ............. H04L 63/1408; H04L 63/1416; H04L 63/1425; H04L 63/1433; H04L 63/1441; H04L 63/145; H04W 12/08; H04W 12/10; H04W 12/12
See application file for complete search history.

(56) References Cited

U.S. PATENT DOCUMENTS

| | | | |
|---|---|---|---|
| 2010/0043072 A1* | 2/2010 | Rothwell | G06F 21/566 726/24 |
| 2010/0318746 A1* | 12/2010 | Troxel | G06F 11/1438 711/141 |
| 2012/0254995 A1* | 10/2012 | Sallam | G06F 21/554 726/22 |
| 2014/0215136 A1* | 7/2014 | Gole | G06F 3/0616 711/103 |
| 2015/0264077 A1* | 9/2015 | Berger | G06F 21/554 726/23 |
| 2017/0075942 A1* | 3/2017 | Childs | G06F 12/023 |

OTHER PUBLICATIONS

"FireEye", https://www.fireeye.com/index.html, as accessed Mar. 14, 2016, (Apr. 29, 2007).

"Memoryze", https://www.fireeye.com/services/freeware/memoryze.html, as acessed Mar. 14, 2016, Mandiant, FireEye, Inc., (Sep. 10, 2015).

"SecureWorks", https://www.secureworks.com/, as accessed Mar. 14, 2016, (Jan. 11, 1998).

"Cyber Security Services", https://www.symantec.com/services/cyber-security-services, as accessed Mar. 14, 2016, Symantec Corporation, (Mar. 1, 2016).

"Mandiant", https://www.fireeye.com/services.html, as accessed Mar. 14, 2016, FireEye, Inc., (Jan. 13, 2015).

* cited by examiner

| | Log of Data Changes | | |
|---|---|---|---|
| | 402 | | |
| BLOCK | VALUE | TIME | DATE |
| 10 | 0 | 03:43:21 | 04-22-16 |
| 8 | 1 | 03:43:22 | 04-22-16 |
| 7 | 1 | 03:43:23 | 04-22-16 |
| 9 | 1 | 03:43:24 | 04-22-16 |
| 11 | 0 | 11:12:06 | 04-22-16 |
| 17 | 1 | 11:12:07 | 04-22-16 |
| 18 | 0 | 11:12:08 | 04-22-16 |
| 19 | 0 | 11:12:09 | 04-22-16 |
| 5 | 1 | 06:22:58 | 04-23-16 |
| 3 | 0 | 06:22:59 | 04-23-16 |
| 1 | 1 | 06:23:00 | 04-23-16 |
| 2 | 1 | 06:23:01 | 04-23-16 |
| 4 | 1 | 06:23:02 | 04-23-16 |

*FIG. 4*

Consolidated Log
502

| BLOCK | VALUE | TIME | DATE |
|---|---|---|---|
| 7 | 1 | 03:43:24 | 04-22-16 |
| 8 | 1 | | |
| 9 | 1 | | |
| 10 | 0 | | |
| 11 | 0 | | |

Consolidated Log
504

| BLOCK | VALUE | TIME | DATE |
|---|---|---|---|
| 17 | 1 | 11:12:09 | 04-22-16 |
| 18 | 0 | | |
| 19 | 0 | | |

Consolidated Log
506

| BLOCK | VALUE | TIME | DATE |
|---|---|---|---|
| 1 | 1 | 06:23:02 | 04-23-16 |
| 2 | 1 | | |
| 3 | 0 | | |
| 4 | 1 | | |
| 5 | 1 | | |

SYSTEMS AND METHODS FOR GENERATING MEMORY IMAGES OF COMPUTING DEVICES

BACKGROUND

Memory images of computing devices (e.g., snapshots of all of the data stored on the devices at particular points in time) may be generated and/or analyzed by a variety of services. For example, security forensics systems and other security services may analyze an image of a computing device while attempting to identify a security breach or malfunction on the device. In particular, after a computing device experiences a performance and/or security failure, a security service may retrieve and/or copy all of the data from the computing device onto a separate device (e.g., a backend server or virtual machine) for analysis. The service may then analyze the re-created state of the computing device to identify a cause of the device's failure.

Unfortunately, traditional image-generating systems may be unable to efficiently and/or accurately generate memory images of computing devices. For example, the process of copying all of the data from a computing device to a separate server for analysis may interrupt normal operations of the device. Furthermore, such a process may disrupt data stored within the device that may indicate a cause of the device's malfunction. In addition, because the memory within a computing device may be constantly changing, a conventional image-generating technology that retrieves data from the device while the device is running may produce an inconsistent and/or inaccurate image of the device. For example, the data within an image created by a traditional image-generating service may represent various states of the computing device, rather than the state of the device at a single point in time. The current disclosure, therefore, identifies and addresses a need for improved systems and methods for generating memory images of computing devices.

SUMMARY

As will be described in greater detail below, the instant disclosure describes various systems and methods for generating memory images of computing devices by tracking changes made to data stored within a computing device in real-time and then compiling the changes into an image of the computing device that represents the state of the computing device at a particular point in time. In one example, a computer-implemented method for performing such a task may include (1) monitoring a computing device to detect changes made to data stored within the computing device, (2) maintaining a log that describes the changes made to the data stored within the computing device by recording, in response to detecting a change made to a portion of data, both a state of the portion of data after the data change occurred and a time at which the data change occurred, (3) detecting an event that triggers generation of an image of the computing device that represents a state of the computing device at a particular point in time, (4) in response to detecting the event, generating the image of the computing device by incorporating at least a portion of the log of data changes into the image.

In some examples, monitoring the computing device to detect the data changes within the computing device may include intercepting calls by an operating system of the computing device to modify memory within the computing device. Additionally or alternatively, monitoring the computing device to detect the data changes may include determining a rate at which the portion of data is undergoing changes. In some embodiments, the method may include determining that the rate at which the portion of data is undergoing changes exceeds a predetermined threshold. In such embodiments, maintaining the log of data changes may include recording a state of the entire portion of data at periodic time intervals while the portion of data is undergoing changes at the rate that exceeds the predetermined threshold. In other embodiments, the method may include determining that the rate at which the portion of data is undergoing changes is below a predetermined threshold. In these embodiments, maintaining the log of data changes may include recording each individual change made to the portion of data while the portion of data is undergoing changes at the rate that is below the predetermined threshold.

In some examples, maintaining the log of data changes may include storing the log of data changes in a secure portion of memory that is separate from memory used by an operating system of the computing device. Additionally or alternatively, maintaining the log of data changes may include periodically consolidating portions of the log of data changes into small memory images that represent portions of the computing device at various points in time. In these examples, generating the image of the computing device that represents the state of the computing device at the particular point in time may include combining multiple small memory images of the computing device. Furthermore, periodically consolidating portions of the log of data changes into small memory images may include reducing an amount of memory involved in storing the log of data changes.

In some embodiments, detecting the event that triggers generation of the image may include detecting a request by a user to generate the image. Additionally or alternatively, detecting the event may include detecting a potential security breach on the computing device.

In some examples, generating the image of the computing device may be performed without retrieving data from the computing device after detecting the event on the computing device. Furthermore, in some embodiments, the method may also include analyzing the image of the computing device to detect a security breach on the computing device and then performing a security action to mitigate the security breach.

In one embodiment, a system for implementing the above-described method may include (1) a monitoring module that monitors a computing device to detect changes made to data stored within the computing device, (2) a maintenance module that maintains a log that describes the changes made to the data stored within the computing device by recording, in response to detecting a change made to a portion of data, both a state of the portion of data after the data change occurred and a time at which the data change occurred, (3) a detection module that detects an event that triggers generation of an image of the computing device that represents a state of the computing device at a particular point in time, and (4) an image module that generates, in response to detecting the event, the image of the computing device by incorporating at least a portion of the log of data changes into the image. In addition, the system may include at least one hardware processor configured to execute the monitoring module, the maintenance module, the detection module, and the image module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor the computing device to detect changes made to data stored within the computing device, (2) maintain a log that describes the changes made to the data stored within the computing device by recording, in response to detecting a change made to a portion of data, both a state of the portion of data after the data change occurred and a time at which the data change occurred, (3) detect an event that triggers generation of an image of the computing device that represents a state of the computing device at a particular point in time, and (4) in response to detecting the event, generate the image of the computing device by incorporating at least a portion of the log of data changes into the image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary log of data changes.

FIG. 5 is an illustration of exemplary consolidated portions of a log of data changes.

Figure 1:
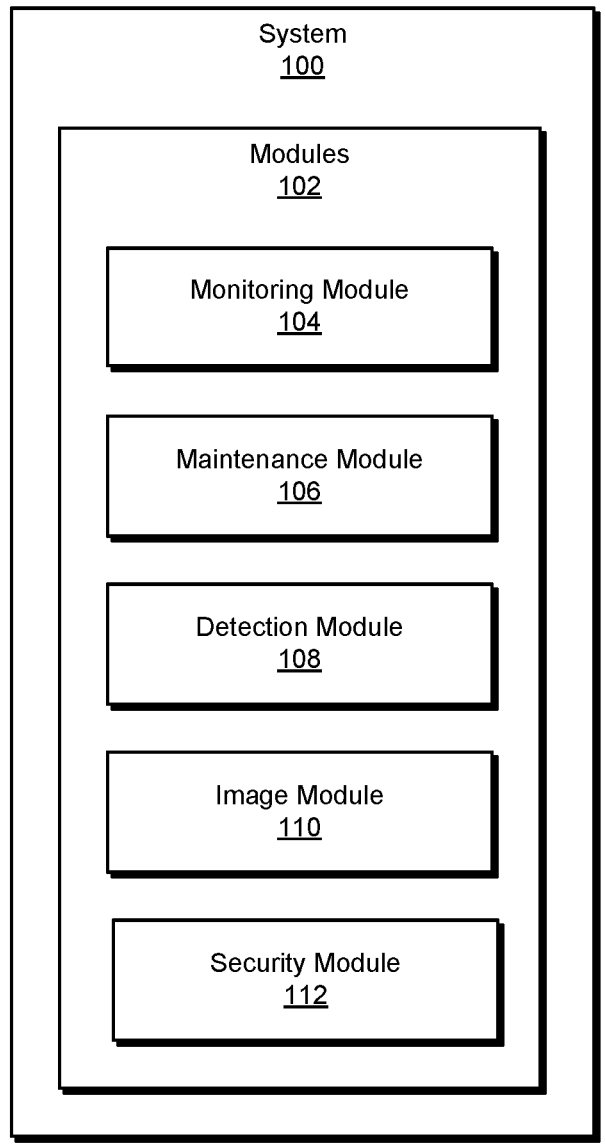
FIG. 1 is a block diagram of an exemplary system for generating memory images of computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating memory images of computing devices. As will be explained in greater detail below, by detecting and recording data changes within a computing device, the systems and methods described herein may efficiently generate memory images of the computing device that represent the state of the computing device at various points in time. Specifically, by tracking data changes in real-time and storing information about the data changes externally from a computing device, the disclosed systems and methods may generate a memory image without retrieving additional data from the computing device and without disturbing the data stored within the computing device. As such, the systems and methods described herein may provide clean, consistent, and accurate memory images of computing devices to security systems (e.g., security forensics systems) and other services.

Figure 2:
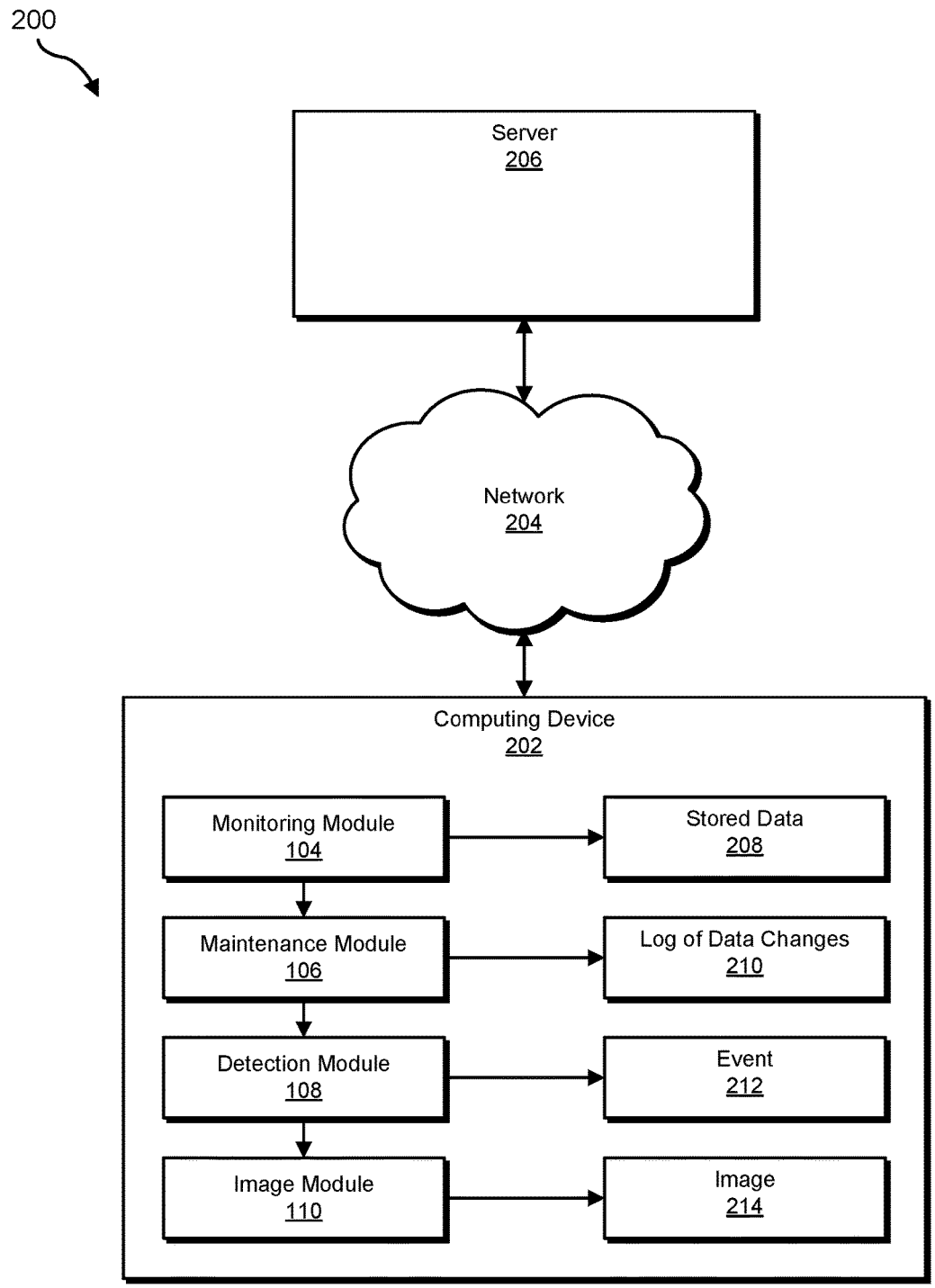
FIG. 2 is a block diagram of an additional exemplary system for generating memory images of computing devices.

The following will provide, with reference to FIGS. 1 and 2, detailed descriptions of exemplary systems for generating memory images of computing devices. Detailed descriptions of corresponding computer-implemented methods will also be provided in connection with FIG. 3. In addition, detailed descriptions of logs of data changes and consolidated portions of logs of data changes will be provided in connection with FIGS. 4 and 5, respectively. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for generating memory images of computing devices. As illustrated in this figure, exemplary system 100 may include one or more modules 102 for performing one or more tasks. For example, and as will be explained in greater detail below, exemplary system 100 may include a monitoring module 104 that monitors a computing device to detect changes made to data stored within the computing device. Exemplary system 100 may also include a maintenance module 106 that maintains a log that describes the changes made to the data stored within the computing device by recording, in response to a change made to a portion of data, both a state of the portion of data after the data change occurred and a time at which the data change occurred.

In addition, and as will be described in greater detail below, exemplary system 100 may include a detection module 108 that detects an event that triggers generation of an image of the computing device that represents a state of the computing device at a particular point in time. Exemplary system 100 may also include an image module 110 that generates, in response to the event, the image of the computing device by incorporating at least a portion of the log of data changes into the image. Finally, exemplary system 100 may include a security module 112 that analyzes the image to detect a security breach on the computing device and then performs one or more security actions to mitigate the security breach. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. In this example, modules 102 may operate as part of an image-generating service installed on computing device 202 that detects and records changes made to data stored within computing device 202. Additionally or alternatively, server 206 may be programmed with one or more of modules 102. In these examples, the modules hosted on server 206 may be in communication with the service installed on computing device 202 to consolidate portions of a log of changes made to data stored within computing device 202 and/or generate memory images of computing device 202.

In one embodiment, one or more of modules 102 from FIG. 1 may, when executed by at least one processor of computing device 202 and/or server 206, enable computing device 202 and/or server 206 to generate memory images of computing devices. For example, and as will be described in greater detail below, monitoring module 104 may cause computing device 202 and/or server 206 to monitor computing device 202 to detect changes made to stored data 208 within computing device 202. In addition, maintenance module 106 may cause computing device 202 and/or server 206 to maintain a log of data changes 210 that describes the changes made to stored data 208 by recording, in response to a change made to a portion of stored data 208, both a state of the portion of data after the data change occurred and a time at which the data change occurred. Next, detection module 108 may cause computing device 202 and/or server 206 to detect an event 212 that triggers generation of an image 214 that represents a state of computing device 202 at a particular point in time. In response to event 212, image module 110 may cause computing device 202 and/or server 206 to generate image 214 by incorporating at least a portion of log of data changes 210 into image 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of maintaining logs of data changes and/or generating memory images of computing devices. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
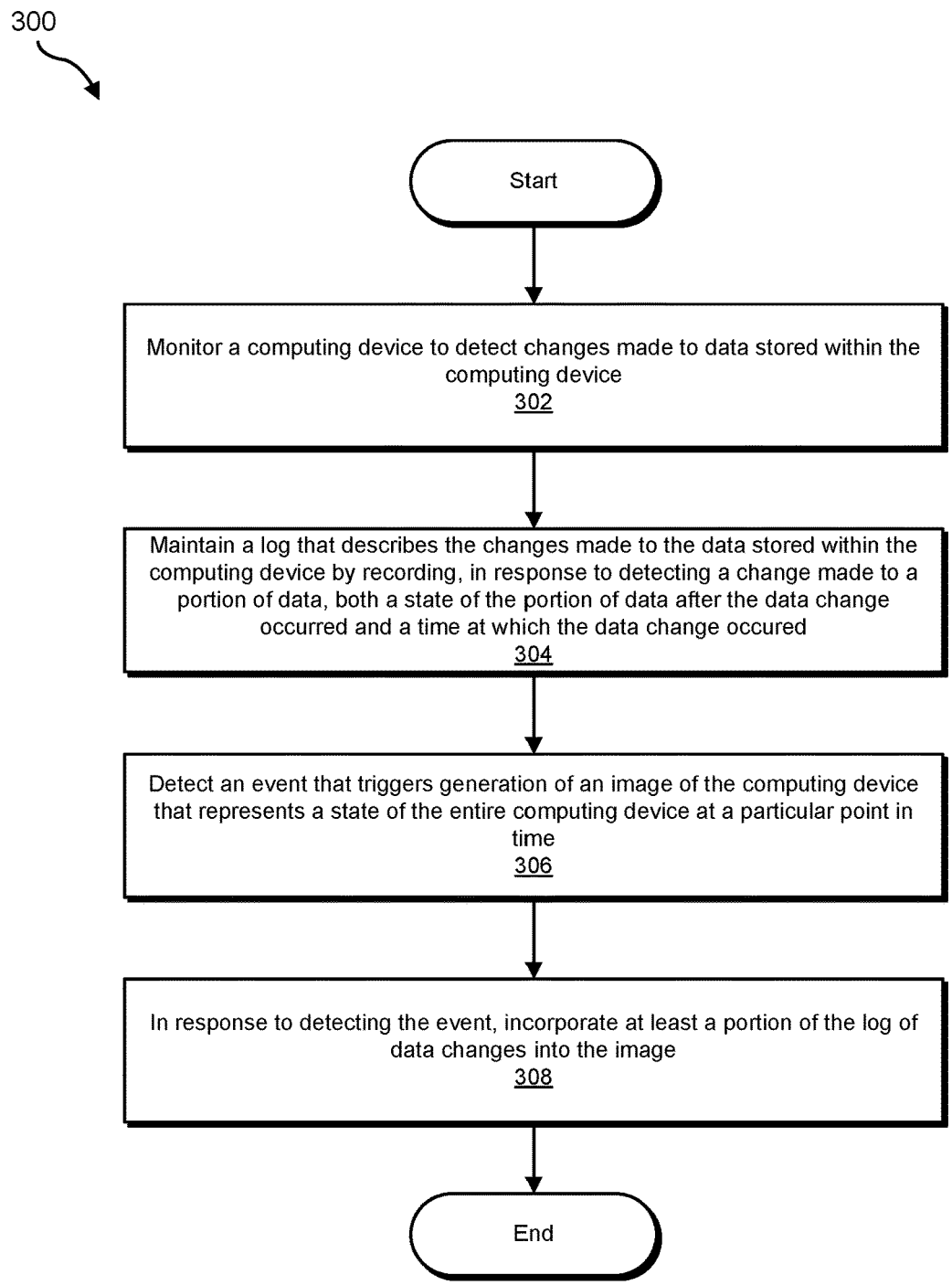
FIG. 3 is a flow diagram of an exemplary method for generating memory images of computing devices.

FIG. 3 is a flow diagram of an exemplary computer-implemented method 300 for generating memory images of computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may monitor a computing device to detect changes made to data stored within the computing device. For example, monitoring module 104 may, as part of computing device 202 in FIG. 2, monitor computing device 202 to detect changes made to stored data 208.

The term "data," as used herein, generally refers to any type or form of electronic information stored within in a computing device. Examples of data include, without limitation, files, documents, applications, and executable code. Data may be stored within a computing device in a variety of ways, such as within a physical hard drive of the computing device, within a fast-access memory or cache of the computing device, and/or within a removable storage device in communication with the computing device.

The systems described herein may detect changes made to data stored within a computing device in a variety of ways. In some examples, monitoring module 104 may monitor a computing device to detect any type or form of modification made to memory stored within the computing device. For example, monitoring module 104 may detect each instance that a user, program, application, or other entity directs the computing device to create a new portion of data, replace or over-write an existing portion of data, and/or delete a portion of data.

Monitoring module 104 may implement a variety of techniques or processes to detect data changes within a computing device. In some examples, monitoring module 104 may intercept (e.g., hook) calls by an operating system of a computing device to modify memory within the computing device. As an example, when running within a LINUX operating system, monitoring module 104 may replace and/or control a virtual memory manager of the operating system. In the event that monitoring module 104 is running within a WINDOWS operating system, monitoring module 104 may implement hooks above a kernel of the operating system to monitor memory calls made by each process running within the operating system. In general, monitoring module 104 may employ any type or form of monitoring and/or hooking technique tailored to the operating system in which monitoring module 104 is detecting data changes.

In some embodiments, in addition to detecting each data change within a computing device, monitoring module 104 may determine a rate at which portions of data are undergoing changes. For example, monitoring module 104 may identify a portion of memory that has been allocated to a particular process. Monitoring module 104 may then monitor the frequency with which the portion of memory experiences data changes while the process is executing. Specifically, monitoring module 104 may track the number of data changes within the portion of memory that are made within a predetermined time interval (e.g., half a second). As will be explained in greater detail below, by determining rates at which portions of data undergo changes, the systems described herein may more efficiently record data changes that indicate important and/or significant updates to the state of a computing device.

Returning to FIG. 3, at step 304 one or more of the systems described herein may maintain a log that describes the changes made to the data stored within the computing device by recording, in response to detecting a change made to a portion of data, both a state of the portion of data after the data change occurred and a time at which the data change occurred. For example, maintenance module 106 may, as part of computing device 202 in FIG. 2, maintain log of data changes 210 by recording, in response to a change made to a portion of stored data 208, both a state of the portion of stored data 208 after the data change occurred and a time at which the data change occurred.

The systems described herein may maintain a log of data changes in a variety of ways. In some examples, maintenance module 106 may record information about each data change detected by monitoring module 104. For example, after detecting each change made to a portion of data, maintenance module 106 may associate a location and/or other identifier of the portion of data with a value and/or state of the data after the data change. In addition, maintenance module 106 may associate the portion of data with a time and/or date at which the data change occurred. Notably, maintenance module 106 may record information about a data change within a computing device in real-time immediately following the data change (i.e., while the computing device is still running). In contrast, traditional security systems may begin retrieving data from a computing device only after the computing device has crashed or failed due to a security breach.

As an example, FIG. 4 illustrates a log of data changes 402. In this example, the information within log of data changes 402 may describe changes made to a portion of the data blocks within a computing device. Specifically, log of data changes 402 may represent each change to a data block on the computing device that occurred between 03:43:21 on 04-22-16 and 06:23:02 on 04-23-16. As shown in FIG. 4, log of data changes 402 may indicate a number associated with each data block that experienced a data change, a value of the data bock after the change (i.e., either "0" or "1"), a time of day of the data change, and a date of the data change.

The term "data block," as used herein, generally refers to any type or form of unit of data. In the example of FIG. 4, each data block contains a single bit. However, in other examples, the systems described herein may monitor and record changes made to data blocks of larger sizes (e.g., 8 bits, 16 bits, etc.).

In some examples, maintenance module 106 may record information about changes made to a portion of data based on how frequently the portion of data is changing. For example, as explained above, monitoring module 104 may track the rates at which portions of data are undergoing changes while monitoring data changes within a computing device. In the event that a portion of data is changing at a rate that is above a certain frequency (e.g., 300 times per second), maintenance module 106 may periodically record snapshots of the state of the portion of data, rather than record each individual change made to the portion of data. For example, maintenance module 106 may record the state of the portion of data at a periodic time interval (e.g., every minute) and/or after a certain number of changes (e.g., 1000 changes) while the portion of data is experiencing changes at an elevated rate. Once the rate at which the portion of data is changing drops below a threshold rate, maintenance module 106 may resume recording every individual change made to the portion of data. By periodically recording snapshots of rapidly-changing data, maintenance module 106 may capture important alterations in the state of a computing device (e.g., alterations that may indicate a security breach), while not overwhelming a log of data changes with information about every small data change that occurs while the computing device is operating normally.

Additionally, in some embodiments, maintenance module 106 may periodically consolidate multiple entries within a log of data changes after the entries have been recorded. For example, maintenance module 106 may amalgamate a group of entries into a snapshot or image of a portion of data after determining that the entries describe related data changes. As an example, maintenance module 106 may consolidate data entries that represent changes produced by the execution of a single process to create a snapshot of the final state of the portion of data involved in the process. As will be explained in greater detail below, periodically consolidating portions of a log of data changes into small memory images (e.g., memory deltas) may increase the efficiency of generating an image of an entire computing device.

As an example of generating small memory images, FIG. 5 illustrates consolidated portions of log of data changes 402 shown in FIG. 4. In this example, maintenance module 106 may generate a consolidated log 502 after detecting the changes to data blocks 7-11 described in FIG. 4. For example, maintenance module 106 may consolidate entries associated with data blocks 7-11 in response to determining that data blocks 7-11 are contiguous and/or related (e.g., allocated to the same application) and that the changes made to data blocks 7-11 occurred simultaneously and/or at a similar time. As shown in FIG. 5, consolidated log 502 may describe the values of data blocks 7-11 after the last change to data blocks 7-11 occurred (i.e., at 03:43:24 on 04-22-16). Consolidated log 504 and consolidated log 506 illustrate similar representations of data blocks 17-19 and 1-5, respectively.

In some embodiments, the systems described herein may store a log of data changes associated with a computing device in a secure location that is separate from memory used by the computing device. For example, maintenance module 106 may store the log of data changes in a section of memory within the computing device that is partitioned from an operating system of the computing device. Alternatively, maintenance module 106 may store the log of data changes in a separate device (e.g., a virtual machine, removable storage device, or backend server). As such, maintenance module 106 may prevent normal operations of the computing device from interfering with the log of data changes, as well as prevent the actions of maintenance module 106 from altering the data stored within the computing device. Furthermore, storing a log of data changes in a location external to a computing device may ensure that the log of data changes is not altered in the event that the computing device is compromised by a security breach.

Returning to FIG. 3, at step 306 one or more of the systems described herein may detect an event that triggers generation of an image of the computing device that represents a state of the computing device at a particular point in time. For example, detection module 108 may, as part of computing device 202 in FIG. 2, detect event 212 on computing device 202 that triggers generation of image 214.

The term "event," as used herein, generally refers to any type or form of activity, input, or indication on a computing device that directs or prompts the creation of an image of the computing device. In addition, the terms "image" and "memory image," as used herein, generally refer to any type or form of copy, replication, or reproduction of all or a portion of the data stored within a computing device. For example, an image of a computing device may represent the state all of the applications, files, documents, registries, and other data stored within the computing device at a particular point in time.

The systems described herein may detect an event that triggers generation of an image of a computing device in a variety of ways. In some examples, detection module 108 may determine that a user and/or administrator of a computing device has initiated the generation of an image. For example, detection module 108 may determine that a user has prompted the systems described herein to generate an image of all or a portion of a computing device so that the image may be provided to a security service or used in other analyses.

Additionally or alternatively, detection module 108 may monitor a computing device to detect an indication that an image of the computing device should be generated. For example, detection module 108 may determine that an image of a computing device may be helpful in identifying the cause of a security breach or other malfunction on the computing device. As such, detection module 108 may monitor the computing device for any unusual, unexpected, and/or harmful events, such as failures of all or a portion of the device's operating system and/or potential intrusions by attackers.

In some examples, detection module 108 may detect an event that triggers generation of an image that represents the most current or up-to-date state of a computing device. For example, detection module 108 may determine to generate an image of the state of a computing device immediately after a potential security breach is detected on the device. However, in other examples, detection module 108 may detect an event that triggers generation of an image that represents a previous state of a computing device. For example, detection module 108 may determine that a user or security service has prompted the disclosed systems to recreate the state of a computing device as the computing device was at a particular time in the past (e.g., one minute in the past, two days in the past, etc.).

Returning to FIG. 3, at step 308 one or more of the systems described herein may generate, in response to detecting the event, the image of the computing device by incorporating at least a portion of the log of data changes into the image. For example, image module 110 may, as part of computing device 202 in FIG. 2, generate, in response to event 212, image 214 by incorporating at least a portion of log of data changes 210 into image 214.

The systems described herein may generate an image of a computing device in a variety of ways. In some examples, image module 110 may receive, from detection module 108, an instruction to generate an image of a computing device that represents the computing device at a particular point in time. In response to the instruction, image module 110 may identify entries within of a log of data changes that describe a state of all or a portion of the data within the computing device at the indicated time. Image module 110 may then replicate the identified states within a section of memory dedicated for use in generating memory images. Notably, because the log of data changes may be stored in a separate location from the computing device, image module 110 may avoid the resource-intensive and/or time-consuming task of retrieving all of the necessary data from within the computing device. Instead, image module 110 may combine and/or copy multiple small memory images (e.g., memory deltas or snapshots) that have already been generated and stored by maintenance module 106.

As an example, image module 110 may receive an instruction to generate an image of the computing device associated with the data logs illustrated within FIGS. 4 and 5. Specifically, image module 110 may be directed to create an image of the computing device that represents the state of the computing device at 12:00:00 on 04-22-16. In response, image module 110 may transfer and/or copy data within consolidated log 502 and consolidated log 504 to a portion of memory dedicated to generating memory images of the computing device. Specifically, image module 110 may replicate the states of data blocks 7-11 and 17-19 given by consolidated logs 502 and 504. However, image module 110 may not replicate the states of data blocks 1-5 given by consolidated log 506, as the data changes represented within consolidated log 506 occurred after 12:00:00 on 04-22-16. Instead, image module 110 may identify data entries and/or an additional consolidated log that describes the state of data blocks 1-5 at or before 12:00:00 on 04-22-16. Image module 110 may repeat such a process for all of the remaining data blocks within the computing device.

The systems described herein may utilize an image of a computing device for a variety of purposes. In some examples, security module 112 may provide an image to an application or process (e.g., a security forensics service) that requested the image of the computing device. Additionally or alternatively, security module 112 may directly analyze an image of a computing device to detect a security breach and/or identify the cause of a malfunction on the computing device. For example, security module 112 may search an image for an indication of a specific attack method implemented by an attacker. After identifying a security breach or attack on a computing device, security module 112 may perform one or more security actions to mitigate the threat. For example, security module 112 may increase or tighten security policies on the computing device to reduce the risk of a future attack. Additionally or alternatively, security module 112 may alert a user and/or administrator about the attack and direct the user and/or administrator to take appropriate actions to mitigate harmful consequences of the attack.

As explained above in connection with FIG. 3, an image-generating service running on a computing device may detect and record changes made to data stored within the computing device. Specifically, the service may identify data changes in real-time and store information about the changes in a log maintained in a secure location that is separate from memory used by the computing device. As such, the service may efficiently and accurately compile portions of the log of data changes into images that represent the state of the computing device at various points in time.

Figure 6:
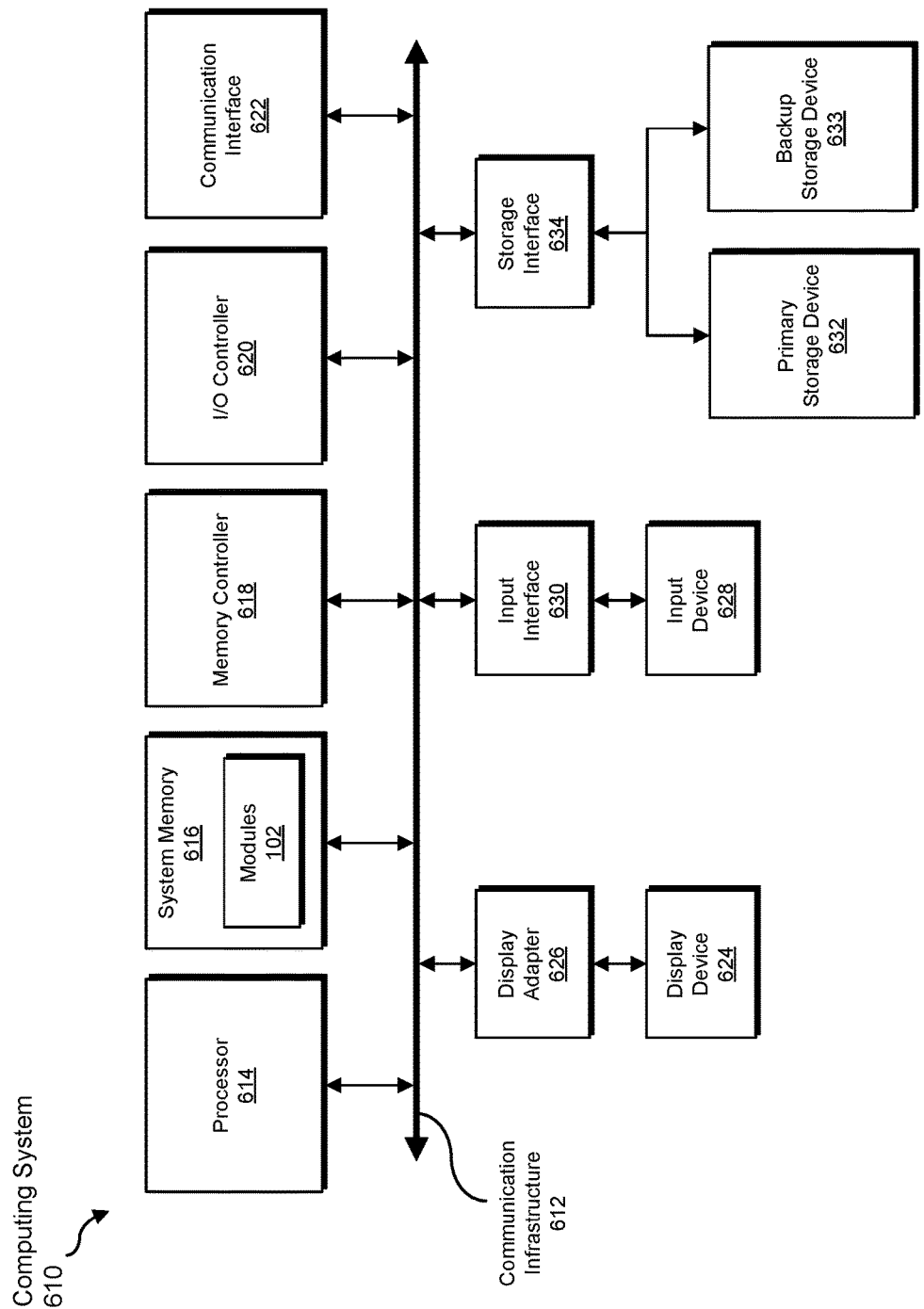
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
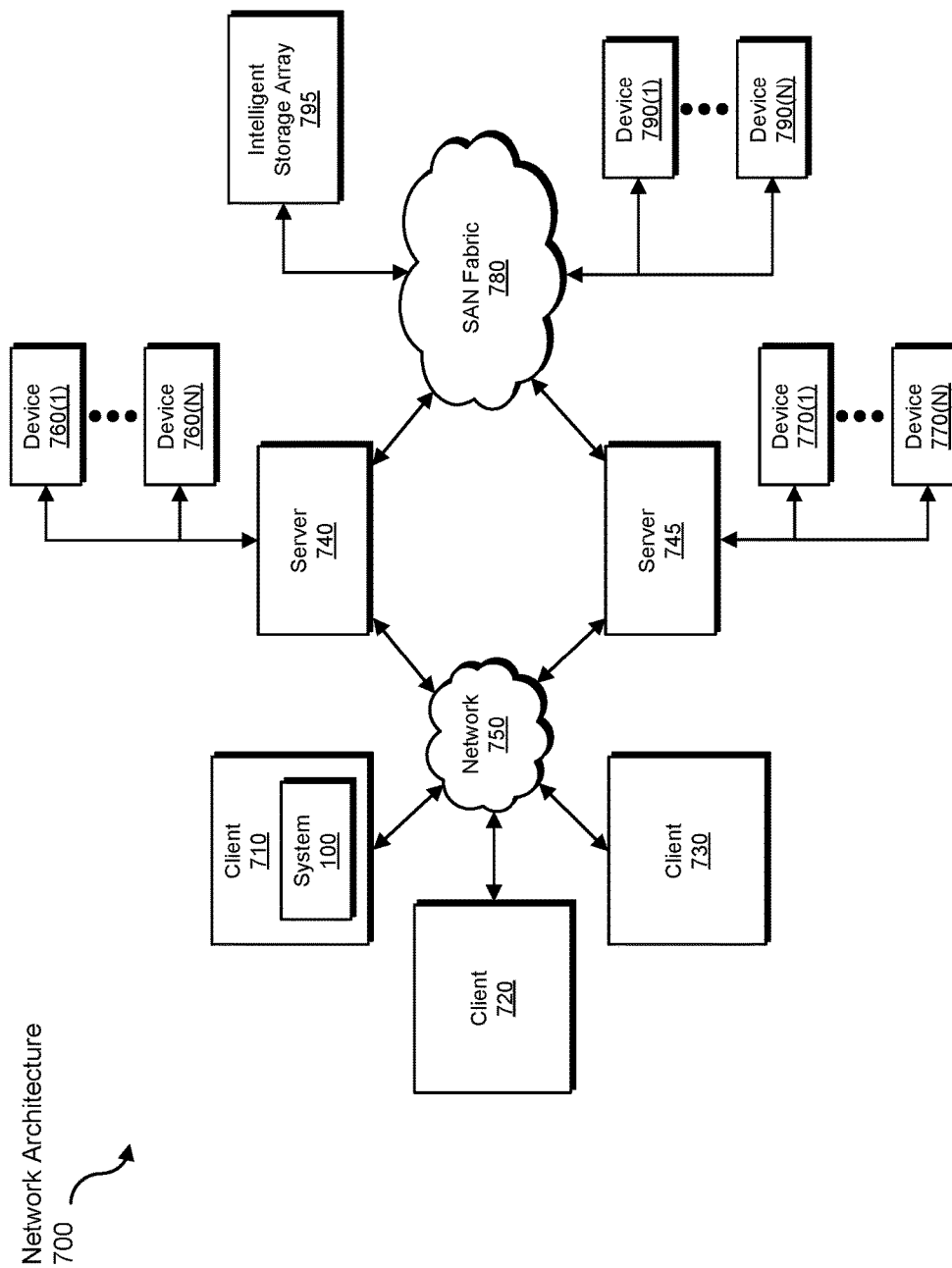
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for generating memory images of computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information about changes made to data stored within a computing device, transform the information about the data changes into an image of the computing device at a particular point in time, output a result of the transformation to a user or security service, use the result of the transformation to identify a security breach on the computing device, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating memory images of computing devices at least a portion of the method being performed by a computing device comprising at least one processor, the method comprising:
    monitoring the computing device to detect changes made to data stored within the computing device;
    maintaining a log that describes the changes made to the data stored within the computing device by recording, in response to detecting a change made to a portion of data, both a state of the portion of data after the data change occurred and a time at which the data change occurred;
    reducing the amount of memory involved in maintaining at least a portion of the log of data changes by:
        identifying a portion of memory within the computing device that has been allocated to a specific process;
        while the computing device is executing the specific process and a rate at which the portion of data is undergoing changes exceeds a predetermined threshold, periodically recording a state of data stored within the portion of memory;
        after the computing device has finished executing the specific process, identifying a plurality of changes made by the specific process to the data stored within the portion of memory;
        generating, based on the plurality of changes made by the specific process to the data stored within the portion of memory, a partial image of the computing device that represents a state of the portion of memory after the computing device executed the specific process; and
        storing, within the log of data changes, the partial image instead of the plurality of changes;
    detecting an event that triggers generation of an image of the computing device that represents a state of the computing device at a particular point in time after the computing device executed the specific process; and
    in response to detecting the event, generating the image of the computing device by combining the partial image of the computing device and at least one additional partial image of the computing device.

2. The method of claim 1, wherein monitoring the computing device to detect the changes made to the data stored within the computing device comprises intercepting calls by an operating system of the computing device to modify memory within the computing device.

3. The method of claim 1, wherein monitoring the computing device to detect the changes made to the data stored within the computing device comprises determining the rate at which the portion of data is undergoing changes.

4. The method of claim 3, wherein determining the rate at which the portion of data is undergoing changes comprises determining that the rate exceeds the predetermined threshold.

5. The method of claim 3, wherein:
    determining the rate at which the portion of data is undergoing changes comprises determining that the rate is below the predetermined threshold; and
    while the rate at which the portion of data is undergoing changes is below the predetermined threshold, recording each individual change made to the portion of data.

6. The method of claim 1, wherein maintaining the log of data changes further comprises storing the log of data changes in a secure portion of memory that is separate from memory used by an operating system of the computing device.

7. The method of claim 1, wherein combining the partial image of the computing device and the additional partial image of the computing device comprises combining multiple partial images of the computing device that each represent a state of a different portion of data after the computing device executed the specific process.

8. The method of claim 1, wherein generating the image of the computing device is performed without retrieving data from the computing device after detecting the event on the computing device.

9. The method of claim 1, wherein detecting the event that triggers generation of the image comprises detecting at least one of:
    a request by a user to generate the image; and
    a potential security breach on the computing device.

10. The method of claim 1, further comprising:
    analyzing the image of the computing device to detect a security breach on the computing device; and
    performing a security action to mitigate the security breach on the computing device.

11. The method of claim 1, wherein the additional partial image of the computing device represents a state of an additional portion of memory after the computing device executed an additional process.

12. A system for generating memory images of computing devices, the system comprising:
    a monitoring module, stored in memory, that monitors a computing device to detect changes made to data stored within the computing device;
    a maintenance module, stored in memory, that:
        maintains a log that describes the changes made to the data stored within the computing device by recording, in response to a change made to a portion of data, both a state of the portion of data after the data change occurred and a time at which the data change occurred; and reduces the amount of memory involved in maintaining at least a portion of the log of data changes by:
identifying a portion of memory within the computing device that has been allocated to a specific process;
while the computing device is executing the specific process and a rate at which the portion of data is undergoing changes exceeds a predetermined threshold, periodically recording a state of data stored within the portion of memory;
after the computing device has finished executing the specific process, identifying a plurality of changes made by the specific process to the data stored within the portion of memory;
generating, based on the plurality of changes made by the specific process to the data stored within the portion of memory, a partial image of the computing device that represents a state of the portion of memory after the computing device executed the specific process; and
storing, within the log of data changes, the partial image instead of the plurality of changes;

a detection module, stored in memory, that detects an event that triggers generation of an image of the computing device that represents a state of the computing device at a particular point in time after the computing device executed the specific process;

an image module, stored in memory, that generates, in response to detecting the event, the image of the computing device by combining the partial image of the computing device and at least one additional partial image of the computing device; and at least one hardware processor configured to execute the monitoring module, the maintenance module, the detection module, and the image module.

13. The system of claim 12, wherein the monitoring module monitors the computing device to detect the changes made to the data stored within the computing device by intercepting calls by an operating system of the computing device to modify memory within the computing device.

14. The system of claim 12, wherein the monitoring module monitors the computing device to detect the changes made to the data stored within the computing device by determining the rate at which the portion of data is undergoing changes.

15. The system of claim 14 wherein the monitoring module determines that the rate at which the portion of data is undergoing changes exceeds the predetermined threshold.

16. The system of claim 14, wherein:
the monitoring module determines that the rate at which the portion of data is undergoing changes is below the predetermined threshold; and the maintenance module records each individual change made to the portion of data while the portion of data is undergoing changes at the rate that is below the predetermined threshold.

17. The system of claim 12, wherein the maintenance module stores the log of data changes in a secure portion of memory that is separate from memory used by an operating system of the computing device.

18. The system of claim 12, further comprising a security module that:
analyzes the image of the computing device to detect a security breach on the computing device; and
performs a security action to mitigate the security breach on the computing device.

19. A non-transitory computer-readable medium comprising one or more computer-readable instructions that, when executed by at least one processor of a computing device, cause the computing device to:
monitor the computing device to detect changes made to data stored within the computing device;
maintain a log that describes the changes made to the data stored within the computing device by recording, in response to detecting a change made to a portion of data, both a state of the portion of data after the data change occurred and a time at which the data change occurred;
reduce the amount of memory involved in maintaining at least a portion of the log of data changes by:
identifying a portion of memory within the computing device that has been allocated to a specific process;
while the computing device is executing the specific process and a rate at which the portion of data is undergoing changes exceeds a predetermined threshold, periodically recording a state of data stored within the portion of memory; after the computing device has finished executing the specific process, identifying a plurality of changes made by the specific process to the data stored within the portion of memory;
generating, based on the plurality of changes made by the specific process to the data stored within the portion of memory, a partial image of the computing device that represents a state of the portion of memory after the computing device executed the specific process; and
storing, within the log of data changes, the partial image instead of the plurality of changes;
detect an event that triggers generation of an image of the computing device that represents a state of the computing device at a particular point in time after the computing device executed the specific process; and
in response to detecting the event, generate the image of the computing device by combining the partial image of the computing device and at least one additional partial image of the computing device.

* * * * *